US005681017A

United States Patent [19]
Clausen

[11] Patent Number: 5,681,017
[45] Date of Patent: Oct. 28, 1997

[54] ADJUSTABLE KEYBOARD HOLDER

[75] Inventor: Eivind Clausen, Bellingham, Wash.

[73] Assignee: Allsop, Inc., Bellingham, Wash.

[21] Appl. No.: 630,495

[22] Filed: Apr. 11, 1996

[51] Int. Cl.⁶ ........................................... A47G 29/00
[52] U.S. Cl. .................. 248/125.1; 108/146; 248/200.1; 248/918
[58] Field of Search ............................ 248/125.1, 125.7, 248/121, 122.1, 132, 200.1, 917, 918, 919, 354.1, 354.6, 354.7; 108/50, 144, 146, 107, 108; 312/194, 223.3

[56] References Cited

U.S. PATENT DOCUMENTS

| 3,589,757 | 6/1971 | Mooney | 248/354.1 X |
|---|---|---|---|
| 3,961,822 | 6/1976 | Daniel | 248/200.1 X |
| 4,638,969 | 1/1987 | Brown | 248/919 X |
| 4,819,900 | 4/1989 | Funk | 108/108 X |
| 5,104,073 | 4/1992 | VanBeek et al. | 248/918 X |

OTHER PUBLICATIONS

Allsop Keyboard Drawer 6000, User Manual, Oct. 23, 1995.

*Primary Examiner*—Ramon O. Ramirez
*Attorney, Agent, or Firm*—Christensen O'Connor Johnson & Kindness PLLC

[57] ABSTRACT

An adjustable holder (8) for supporting and positioning equipment is disclosed. The adjustable holder (8) includes a collar (22) which slides on a substantially upright support leg (20). The collar (22) is attached to one end of an arm (24). A tray (26) is attached to the other end of the arm (24). A cam (34) is pivotally secured to the collar (22) about an axis substantially transverse to the longitudinal axis of the leg (20). A cam face (54) of the cam (34) engages the leg (20) to hold the collar (22) and the tray (26) at variable positions along at least a portion of the length of the leg (20).

20 Claims, 3 Drawing Sheets

ADJUSTABLE KEYBOARD HOLDER

FIELD OF THE INVENTION

This invention relates to methods and apparatus for holding equipment and, more particularly, methods and apparatus that allow the adjustable positioning of equipment.

BACKGROUND OF THE INVENTION

Equipment holders are often used in, for example, homes or offices to position equipment for optimal and convenient use. Conventional equipment holders have a variety of arrangements and operating mechanisms, depending on their particular application. One popular use of such holders has been to support computer keyboards.

Standard computer keyboard trays and drawers take many forms. In one design, a tray on which a keyboard rests is mounted on a sliding assembly attached on an underside of a work surface of a table or desk. The tray slides on guides to allow the tray to move in a substantially horizontal direction. When keyboard use is not desired, the tray can be moved in the general direction of the desk to position the tray underneath the work surface. When keyboard use is desired, the tray can be slid outwardly from below the work surface to uncover the keyboard for use.

Although they allow for some limited adjustment, such sliding trays have disadvantages. Because the trays ride along linear guides, they are limited to one-dimensional movement only. Side to side adjustment is not possible. Furthermore, vertical adjustment of such trays has not been practically available. Accordingly, users of keyboards supported by such trays have been unable to place keyboards or other equipment at desired vertical locations for optimal use.

To partially address these disadvantages, modified trays of the type described above have been developed. They typically include a plurality of substantially identical arms mounted to the underside of a work surface, which are used in conjunction the guiding assemblies described above. On each arm is a vertical array of preformed holes through which fasteners attach to secure the sliding tray. Each hole and its corresponding counterparts on the other arms define discrete height levels for vertical positioning of the tray. Selectively fastening the tray to holes defining a particular level allows the tray to attain a certain height. If, for example, a tray is to have a relatively lowered height, the tray should be fastened to holes on each arm that will adapt the tray to the desired lowered position.

While they overcome some limitations associated with some trays, the use of such modified trays also presents substantial disadvantages. First, vertical repositioning of the tray formed in accordance with this conventional design is time consuming and labor intensive. Each time a tray must be moved to a new height, fasteners must be removed from holes at one level and then reinserted in holes at another level. Furthermore, vertical positioning of the tray is limited by the length of each arm and the spacing of holes on the arms. Use of the tray is only available at discrete, vertical positions corresponding to the hole levels. Vertical positions that do not correspond to a hole level cannot be achieved. Like standard trays, side to side motion is not possible.

The present invention is directed to overcoming the foregoing and other disadvantages. More specifically, the present invention provides a method and apparatus for precisely and conveniently positioning an equipment tray at various locations without the use of removable fasteners and their attendant disadvantages when used in conjunction with mounting assemblies.

SUMMARY OF THE INVENTION

In accordance with this invention, a method and apparatus for adjustably holding and positioning equipment, such as a computer keyboard, at variable positions is provided. The apparatus includes a leg, a collar, an arm, an equipment holder, and a cam. The leg is a substantially upright support having a longitudinal axis. The collar is slidably engaged on the leg. The arm has a first end attached to the collar and a second end which is distal from the collar. Secured to the second end of the arm is the equipment holder. The cam is pivotally secured to the collar about an axis substantially transverse to the longitudinal axis of the leg. The cam has an engageable surface which contacts the leg to hold the collar at various positions along at least a portion of the length of the leg.

In accordance with other aspects of this invention, the leg is substantially vertical.

In accordance with further aspects of this invention, a lever is rigidly attached to the cam, the cam and the lever preferably together form an L shape.

In accordance with other aspects of this invention, the lever is secured to a first end of a spring. On a second end of the spring opposite to the first end, the spring is positioned in the collar. The spring biases the lever outward so that the cam engages the leg.

In accordance with further aspects of this invention, the collar includes a first sleeve and a second sleeve. The second sleeve is partially mounted in the first sleeve. Both the cam and the spring are secured to the second sleeve.

In accordance with other aspects of this invention, the cam is secured to the second sleeve by a pin attached to the cam. The pin has arms that extend from opposed surfaces of the cam. The arms coincide with the axis substantially transverse to the longitudinal axis of the leg.

As will be readily appreciated from the foregoing summary, the invention provides a new and improved method and apparatus for adjustably holding and positioning equipment at various positions. Because the method and apparatus does not employ standard keyboard trays, as described above, the disadvantages associated with the use of such standard trays is avoided. Specifically, the vertical positioning of the equipment on a tray is not limited to a few discrete levels. Further, the extensive time associated with detaching and refastening screws to reposition the tray is avoided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
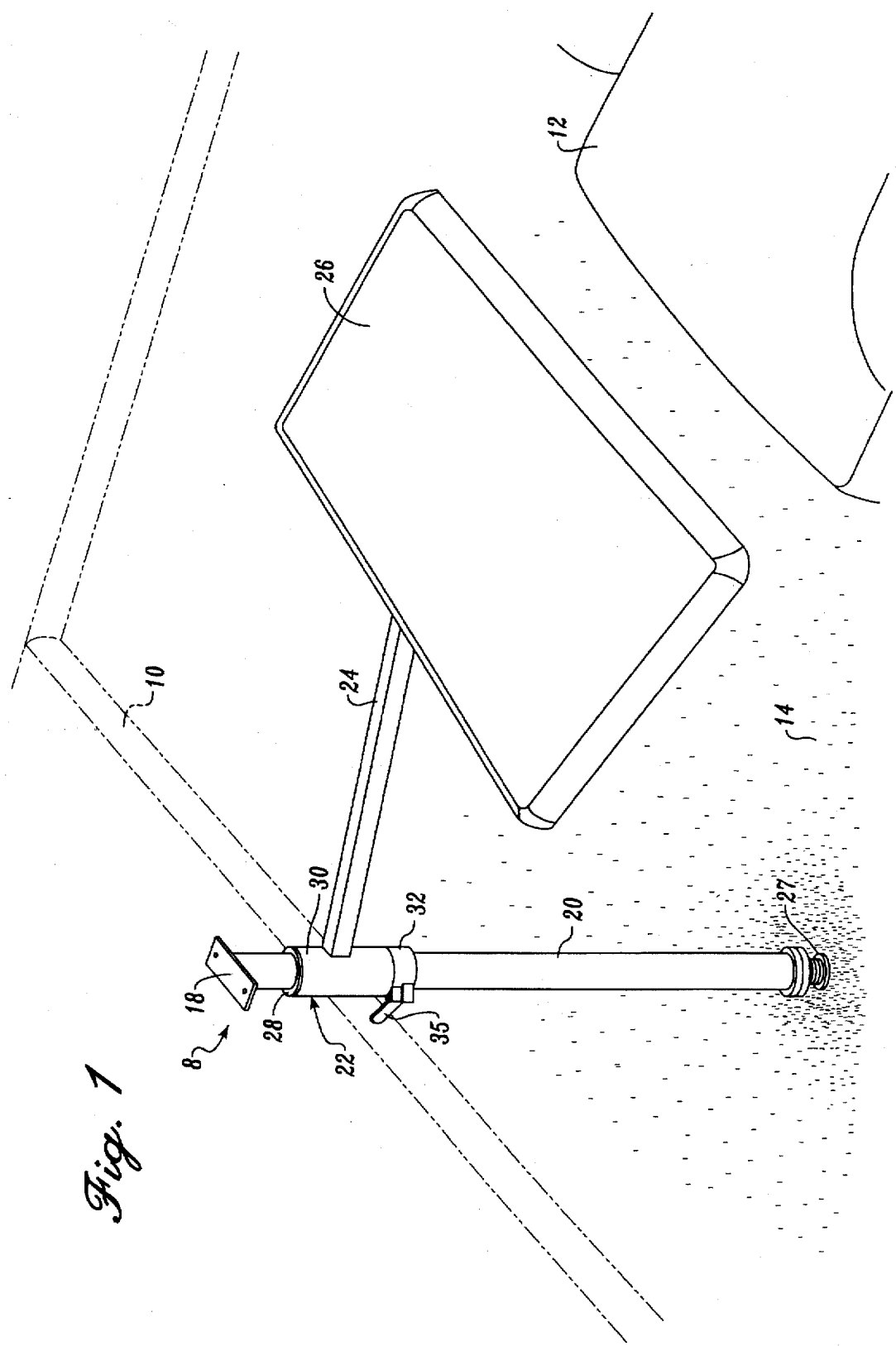
FIG. 1 is a pictorial diagram illustrating an adjustable holder formed in accordance with this invention mounted between a desk and a carpeted floor.
Figure 2:
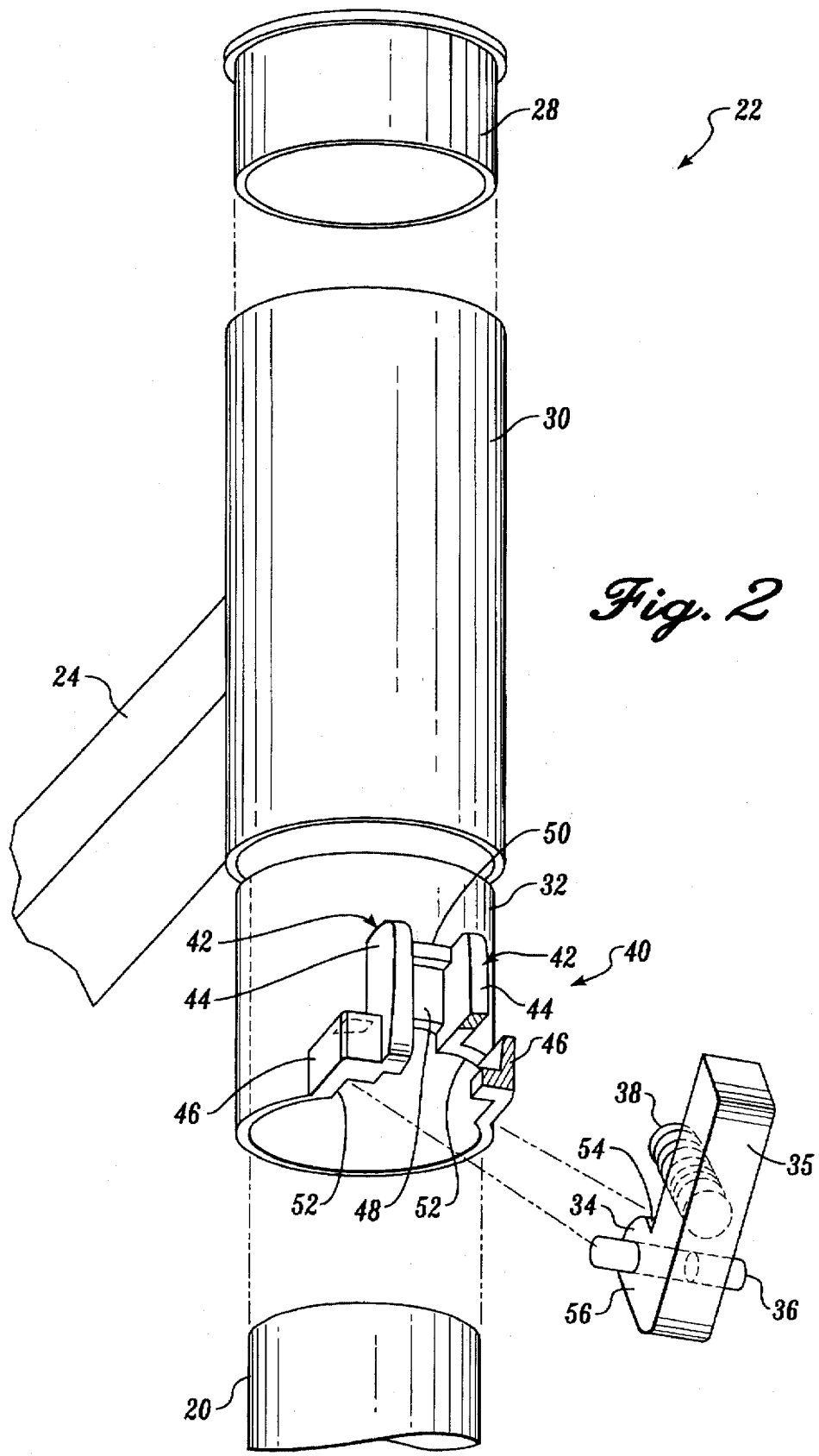
FIG. 2 is an exploded view of a collar of the adjustable holder shown in FIG. 1.

As seen in FIG. 1, an adjustable holder 8 is wedged between a desk 10 and a carpet floor 14. The adjustable holder 8 is positioned to be used by a person sitting in a chair 12. The adjustable holder 8 includes an upper bracket 18, a leg 20, a collar 22, an arm 24, a tray 26, and a gripper 27. As shown by FIG. 2, the collar 22 is preferably comprised of an upper sleeve 28, a main sleeve 30, and a lower sleeve 32. As will be described in more detail below, a cam 34 with a lever 35 is attached to the collar 22 by a pivot pin 36 inserted into the lower sleeve 32. A spring 38 on the lever 35 biases the cam 34 against the leg 20.

The upper bracket 18 is mounted to an underside of the desk 10. The upper bracket 18 is used to secure the adjustable holder 8 at its top end to the desk 10. The upper bracket 18 includes a flange lying within a plane orthogonal to the longitudinal axis of the leg 20. A plurality of holes through the flange of the upper bracket 18 allow fasteners to pass therethrough and into the desk 10 to secure the upper bracket 18 to the desk 10.

The upper bracket 18 is connected to the leg 20. The leg 20 is preferably a long, sturdy hollow rod with a circular cross section. As will be readily appreciated by those skilled in the art, however, the cross-sectional shape of the rod may take various forms. In any event, the leg 20 is long enough so that the upper bracket 18 and the gripper 27 may be securely wedged between a desk 10, or other work surface, and the carpet floor 14. For versatile usage, the leg 20 is variable in length so that the adjustable holder 8 may be used in other situations where the distance between the work surfaces and the carpet floor 14 may be different. As discussed in more detail below, if the adjustable holder 8 is moved to a new location, the length of the leg 20 can be adjusted if necessary to provide a snug fit between a work surface and floor at the new location.

The collar 22 is slidably attached to the leg 20. The collar 22 preferably includes the upper sleeve 28, the tray 26, and the lower sleeve 32. The number of sleeves in the collar 22 may vary. The length of the collar 22 is a fraction of the length of the leg 20 at its shortest length. The upper sleeve 28 and the main sleeve 30 are substantially cylindrical. The collar 22 is formed by mating the upper sleeve 28 and the lower sleeve 32 into the main sleeve 30. The upper sleeve 28, the main sleeve 30, and the lower sleeve 32 are placed over the leg 20. Accordingly, the outer diameter of the leg 20 is smaller than the inner diameter of any of the sleeves. The upper sleeve 28 includes an outwardly protruding flange circumscribing one end. The end of the upper sleeve 28 without the protruding flange is mated with the main sleeve 30 until the protruding flange stops the advancement of the upper sleeve 28 into the main sleeve 30. Accordingly, the inner diameter of the main sleeve 30 should be larger than the outer diameter of the upper sleeve 28 but small enough to abut the protruding flange of the upper sleeve 28. The lower sleeve 32 fits into the lower opening of the main sleeve 30. As will be discussed below in more detail, the lower sleeve 32 is substantially cylindrical in shape with a mounting frame 40 at its lower end.

The arm 24 is attached to the side of the main sleeve 30. The arm 24 is rigidly attached to the main sleeve 30 so that the arm 24 and the longitudinal axis of the adjustable holder 8 are substantially orthogonal. The arm 24 and the main sleeve 30 can be joined to form other angles. For example, they could intersect at an acute angle. In any event, the arm 24 extends from the main sleeve 30 to the tray 26 which holds equipment at various positions. The arm 24 is preferably straight and rectangular in cross section. However, the arm 24 may have a variety of geometries. For example, the arm 24 might be contoured in length. Because the adjustable holder 8 may be used for holding heavy equipment, the main sleeve 30 should be securely joined to the arm 24. Furthermore, the arm 24 must be strong enough to withstand the weight of the equipment it will carry. As stated above, the tray 26 is mounted to the end of the arm 24 distal from the leg 20. The tray 26 preferably has a rectangular surface for supporting the equipment to be used.

As shown in FIG. 2, the lower sleeve 32 is partially inserted into the main sleeve 30 until it is stopped by the protruding mounting frame 40 on the lower end of the lower sleeve 32. Because of the mounting frame 40, the lower end of the lower sleeve 32 does not have a completely circular cross section. Instead, the cross section of the lower opening resembles a horseshoe shape. The mounting frame 40 includes two raised fins 42, each with a vertical portion 44 and a pin socket 46. The vertical portions 44 are spaced apart and aligned in parallel vertical planes so that the cam 34 and the lever 35 can be pivotally mounted thereon, as will be further described below. The mounting frame 40 is symmetrical with respect to a plane that intersects a longitudinal middle line between the vertical portions 44 and the center longitudinal line of the leg 20. The two vertical portions 44 define two walls of a receptacle 48. A third wall of the receptacle 48 is formed by a raised, horizontal wall 50 which lies between the vertical portions 44 and orthogonally abuts each vertical portion 44. Below each vertical portion 44 of one fin 42 is the pin socket 46 which extends from the vertical portion 44 away from the other fin 42. On an interior region of each pin socket 46 is a slot 52. The slots 52 form sockets to hold the pivot pin 36 of the cam 34.

Figure 3:
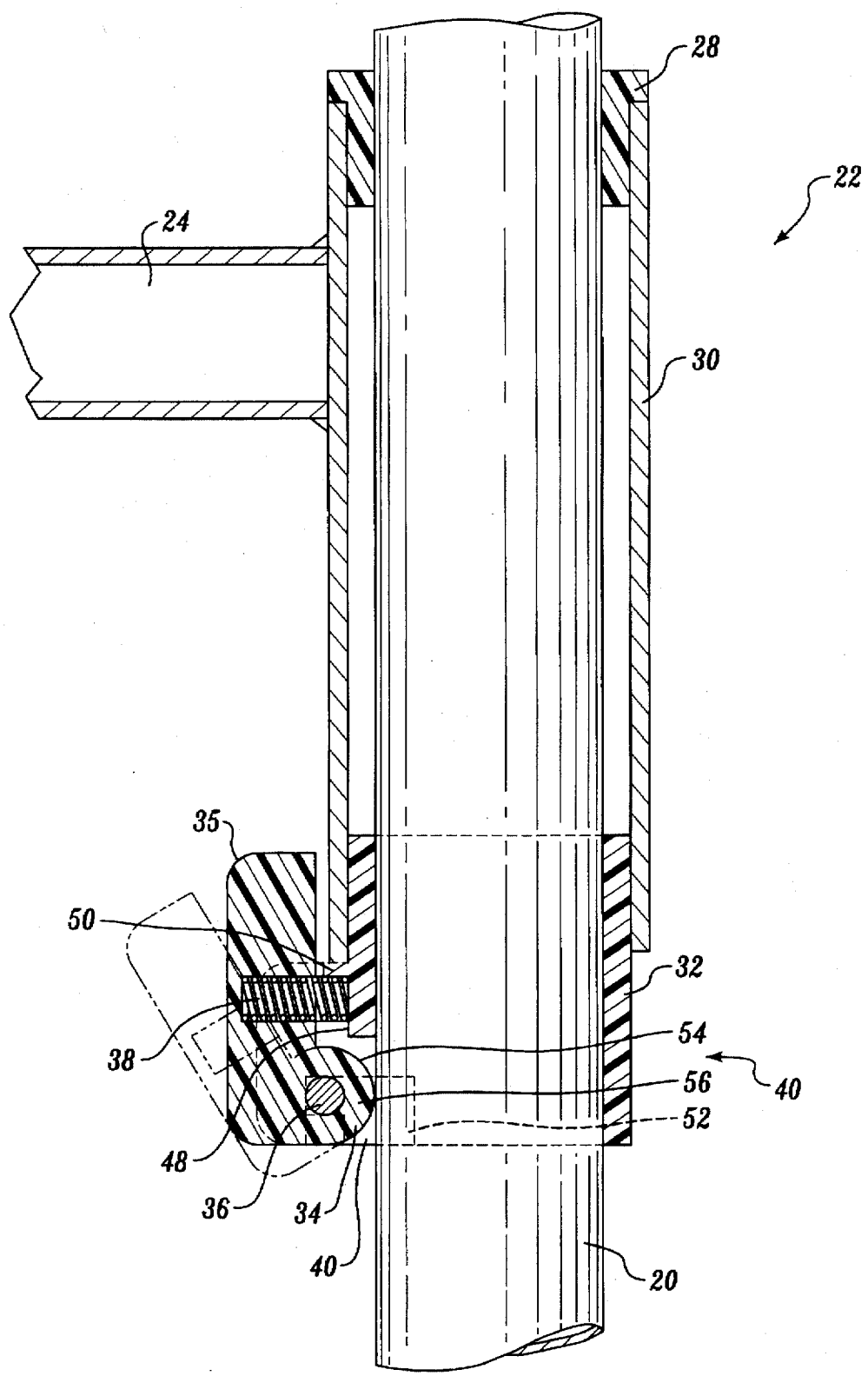
FIG. 3 is a longitudinal cross-sectional view of the collar of the adjustable holder shown in FIG. 1.

As shown in FIGS. 2 and 3, the cam 34 is pivotally attached to the mounting frame 40. The cam 34 has a cam face 54 and two lateral surfaces 56. The lever 35 is connected to the cam 34 to form an L shape with the cam 34. The cam 34 is substantially annular, having a predetermined thickness, i.e., distance between lateral surfaces 56, coinciding with the distance between the vertical portions 44 of the mounting frame 40. The distance between the cam face 54 and a point on the pivot pin 36 continuously increases for at least a portion of the cam face 54. Preferably, a portion of the cam 34 has outer radii of varying values until the cam 34 is joined with the lever 35. Of course, however, the cam 34 could also be circular, having an eccentrically positioned pivot pin 36. Attached to the cam 34 is the lever 35, which extends from the cam 34 to form the L shape. The lever 35 has a thickness substantially equal to the thickness of the cam 34 to form a smooth junction between the cam 34 and the lever 35. The pivot pin 36 passes through the opening of the cam 34 in a direction substantially perpendicular to either plane containing the lateral surfaces 56. The pivot pin 36 extends laterally from each lateral surface 56 of the cam 34. Preferably the pivot pin 36 is circular in cross section.

One end of the spring 38 presses against the lever 35. The spring 38 preferably extends orthogonally from the longitudinal axis of the lever 35 in the direction of the lower sleeve 32 when the cam 34 and the lever 35 are secured thereto. Preferably, the spring 38 is secured to the lever 35 by its placement inside a bore created in the lever 35.

The cam 34 is secured to the mounting frame 40 with the pivot pin 36 positioned into slots 52 inside the pin sockets 46. The placement of the pivot pin 36 in the slots 52 allows the pivot pin 36 and thus the cam 34 to pivot about an axis created by the pivot pin 36. The cam 34 is mounted so that the cam face 54 is incident upon the leg 20. While secured to the mounting frame 40, the lever 35 is positioned above the cam 34. As indicated above, the thickness of the lever 35 and the cam 34 are such to allow their placement between the vertical portions 44 of the mounting frame 40. As shown in FIG. 3, the end of the spring 38 distal from the lever 35 is placed into the receptacle 48 of the mounting frame 40. The spring 38 biases the cam 34 so that the cam face 54 contacts the leg 20.

The gripper 27 to securely position the adjustable holder 8 to the carpet floor 14 is disposed at the lower end of the leg 20. The gripper 27 includes a threaded cylinder, a double nut locking system, and a gripper contact. The gripper contact is a disc-like structure with ridges or spikes on a bottom surface to grip a carpet or other textured floor. However, if the floor is smooth, the gripper can also include an anti-skid pad preferably made of rubber material to create a high-friction contact with the floor. The anti-skid pad has an annular shape with a first and second face. The first face has a substantially smooth top surface. The second face has three concentric raised circular portions defining a concentric first and second circular slit. When the anti-skid pad is to be placed on a smooth floor, the anti-skid pad is positioned under the gripper contact so that the first surface of the anti-skid pad and the bottom surface of the gripper contact face one another and the raised circular portions of the anti-skid pad contact the smooth floor. The threaded cylinder is attached to a top surface of the gripper contact. The longitudinal axis of the threaded cylinder is perpendicular to the plane of the surface to which the threaded cylinder attaches. The threaded cylinder has an outer diameter small enough to allow it to be mated with the leg 20. The threaded cylinder engages an upper nut and a lower nut of the double nut locking system. Both nuts are screwed onto the threaded cylinder and can be positioned along the length of the threaded cylinder by turning the nuts in the appropriate direction. Each nut is a ring-like structure with a circular slit on one surface facing the leg 20. The gripper 27 is inserted into the leg 20 until the lower end of the leg 20 impacts the upper nut by snugly fitting into the circular slit. The lower nut is positioned below the upper nut and impinges thereon to lock the upper nut against the leg 20.

To use the adjustable holder 8, the upper bracket 18 is mounted against the underside of the desk 10 at a desirable location. Fasteners are inserted through preformed holes in the flange of the upper bracket 18 to secure the top end of the adjustable holder 8. The lower end of the adjustable holder 8 is then positioned against the carpet floor 14 to hold the leg 20 in a substantially vertical position. The length of the adjustable holder 8 may be varied to conform to the distance between the carpet floor 14 and the desk 10 by moving the positioning nuts. The positioning nuts are turned relative to the threaded cylinder so that the length of the leg 20 along with the protruding extent of the gripper 27 coincides with the distance between the carpet floor 14 and the underside of the desk 10. In this way, the adjustable holder 8 is snugly wedged and thus capable of supporting equipment on the tray 26. If the floor is a smooth surface, the anti-skid pad is positioned below the gripper contact to create a high-friction contact with the floor.

The tray 26 is moved to a vertical position to allow optimal use of equipment. To change the vertical position, the cam 34 must be disengaged from the leg 20 to allow the collar 22 to freely slide along the length of the leg 20. Disengaging the cam 34 is accomplished by depressing the lever 35 in a generally horizontal direction toward the leg 20, i.e., against the force of the spring 38. As the earn 34 is disengaged, the collar 22 is substantially free to slide along the leg 20 because friction between the cam 34 face and the leg 20 is reduced. The tray 26 and the collar 22 should be moved to a vertical position so that the tray is at an optimal height for using equipment (e.g., a keyboard).

The lever 35 is released to fix the collar 22 at the desired position on the leg 20. The spring 38 then pushes the lever 35 away from the leg 20 to bias the cam face 54 against the leg 20. The weight of the equipment, the collar 22, the arm 24, and the tray 26 forces the collar 22 downwardly with respect to the leg 20. Slight downward movement causes the cam 34 to pivot about the axis created by the pivot pin 36 rotating in the slots 52 of the mounting frame 40. As the cam 34 rotates, its increasing outer radius causes the cam face 54 to wedge the leg 20 against the lower sleeve 32. The cam 34 rotates in a direction of increasing outer radius until the wedging force between it and the leg 20 causes the collar 22 and the leg 20 to be relatively stationary. At this position, the collar 22 and, thus, the tray 26 are fixed at the appropriate vertical position. The horizontal placement of the tray 26 can be determined by rotating the tray 26 and collar 22 about the leg 20 until the desired position is attained, preferably with the lever 35 depressed.

To adjust the collar 22 to a new vertical position, the lever 35 may be depressed in a direction generally toward the lower sleeve 32. This action disengages the cam face 54 from the leg 20, thereby reducing the force of the cam 34 against the leg 20. Alternatively, the collar 22 may be lifted to rotate the cam 34 in a direction of decreasing outer radius. This also reduces the friction between the cam 34 and the leg 20 to allow readjustment of the collar 22 and, thus, the tray 26.

The relative ease in disengaging and engaging the collar 22 along the leg 20 in this manner allows convenient repositioning of the tray 26 when necessary for optimal use. Because the adjustable holder does not require fastening and unfastening screws for readjustment of the tray 26, the time and labor associated with the use of fasteners are avoided. More specifically, the use of the cam 34 to fix the collar 22 at a selected location along the leg 20 greatly simplifies both vertical and horizontal repositioning of the tray 26.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An adjustable support structure for holding and positioning equipment, the structure comprising:

a substantially upright support leg having a longitudinal axis;

a collar slidably engaged on said support leg;

an arm having a first end attached to said collar and a second end distal from said collar;

an equipment holder secured to said second end of said arm; and a cam pivotally secured to said collar about an axis substantially transverse to the longitudinal axis of said leg, said cam having a surface selectively engageable and releasable with said leg, the engagement of said cam with said leg preventing rotation around and sliding along said collar, and the release of said cam with said leg permitting said collar to freely slide along and rotate about said leg so as to define a range of movement of the collar, said cam being configured such that engagement of said cam with said leg at any point along said range of movement causes said collar to be held at said point.

2. An adjustable support structure as claimed in claim 1, wherein said leg is substantially vertical.

3. An adjustable support structure as claimed in claim 2, wherein a lever is rigidly attached to said cam.

4. An adjustable support structure as claimed in claim 3, wherein said lever is secured to a first end of a spring, said spring positioned in said collar on a second end of said spring opposite to said first end, said spring biasing said lever outward so that said cam engages said leg.

5. An adjustable support structure as claimed in claim 4, wherein said collar comprises a first sleeve and a second sleeve, said second sleeve at least partially mounted in said first sleeve, said cam and said spring secured to said second sleeve.

6. An adjustable support structure as claimed in claim 5, wherein said cam is secured to said second sleeve by a pin attached to said cam, said pin having arms which extend from opposed surfaces of said cam, said arms substantially coinciding with the axis substantially transverse to the longitudinal axis of said leg.

7. An adjustable support structure as claimed in claim 6, wherein said cam and said lever together form an L shape.

8. An adjustable support structure as claimed in claim 1, wherein a lever is rigidly attached to said cam.

9. An adjustable support structure as claimed in claim 8, wherein said cam and said lever together form an L shape.

10. An adjustable support structure as claimed in claim 1, wherein said cam is secured to said collar by a pin attached to said cam, said pin having arms which extend from opposed surfaces of said cam, said arms substantially coinciding with the axis substantially transverse to the longitudinal axis of said leg.

11. An adjustable support structure as claimed in claim 1, wherein a spring is secured to said cam, said spring biasing said cam to engage said leg.

12. A method for adjustably holding and positioning equipment comprising the steps of:

erecting a support leg having a longitudinal axis;

sliding and rotating a rotatable collar to a desirable vertical position along said leg, said collar attached to an arm having a first end attached to said collar and a second end distal from said collar attached to an equipment holder, the collar being rotated such that the equipment holder extends a desired direction from said leg; and engaging a surface of a cam with said leg to hold said collar at said desired vertical position and to hold said equipment holder at said desired direction, said cam pivotally secured to said collar about an axis substantially transverse to the longitudinal axis of said leg.

13. The method claimed in claim 12, wherein said steps are practiced sequentially.

14. An adjustable support structure for holding and positioning equipment, the structure comprising:

a substantially vertical support leg having a longitudinal axis;

a collar slidably engaged on said leg, said collar comprising a first sleeve and a second sleeve, said second sleeve at least partially mounted in said first sleeve;

an arm having a first end attached to said collar and a second end distal from said collar;

an equipment holder secured to said second end of said arm;

a cam pivotally secured to said second sleeve about an axis substantially transverse to the longitudinal axis of said leg, said cam having a surface engageable with said leg to hold said collar at variable positions along at least a portion of the length of said leg;

a lever rigidly attached to said cam, said cam and said lever together forming an L shape;

a spring having a first end secured to said lever, said spring positioned in said second sleeve on a second end of said spring opposite to said first end, said spring biasing said lever outward so that said cam engages said leg, said cam and said spring secured to said second sleeve; and a pin attaching said cam to said second sleeve, said pin having arms which extend from opposed surfaces of said cam, said arms substantially coinciding with the axis substantially transverse to the longitudinal axis of said leg.

15. An adjustable support structure for holding and positioning equipment, the structure comprising:

a substantially upright support leg having a longitudinal axis;

a collar slidably engaged on said support leg;

an arm having a first end attached to said collar and a second end distal from said collar;

an equipment holder secured to said second end of said arm; and a cam pivotally secured to said collar by a pin attached to said cam, said pin having arms which extend from opposed surfaces of said cam, said arms having an axis that extends substantially transverse to the longitudinal axis of said leg, said cam having a surface engageable with said leg to hold said collar at variable positions along at least a portion of the length of said leg.

16. An adjustable support structure for holding and positioning equipment, the structure comprising:

a substantially upright support leg having a longitudinal axis;

a collar slidably engaged on said support leg;

an arm having a first end attached to said collar and a second end distal from said collar;

an equipment holder secured to said second end of said arm;

a cam pivotally secured to said collar about an axis substantially transverse to the longitudinal axis of said leg, said cam having a surface engageable with said leg to hold said collar at variable positions along at least a portion of the length of said leg; and a spring secured to said cam, said spring biasing said cam to engage said leg.

17. The adjustable support structure of claim 16, further comprising a lever rigidly attached to said cam, said lever being secured to a first end of said spring, said spring positioned in said collar on a second end of spring opposite the first end, said spring biasing said lever outward so that said cam engages said leg.

18. An adjustable support structure as claimed in claim 17, wherein said collar comprises a first sleeve and a second sleeve, said second sleeve at least partially mounted in said first sleeve, said cam and said spring secured to said second sleeve.

19. An adjustable support structure as claimed in claim 18, wherein said cam is secured to said second sleeve by a pin attached to said cam, said pin having arms which extend from opposed surfaces of said cam, said arms substantially coinciding with the axis substantially transverse to the longitudinal axis of said leg.

20. An adjustable support structure as claimed in claim 19, wherein said cam and said lever together form an L shape.

* * * * *

UNITED STATES PATENT AND TRADEMARK OFFICE
CERTIFICATE OF CORRECTION

PATENT NO. : 5,681,017
DATED : October 28, 1997
INVENTOR(S) : E. Clausen

It is certified that error appears in the above-indentified patent and that said Letters Patent is hereby corrected as shown below:

COLUMN   LINE

6            51         after "; and" insert a character return

Signed and Sealed this

Twenty-fourth Day of February, 1998

Attest:

BRUCE LEHMAN

*Attesting Officer*   *Commissioner of Patents and Trademarks*